United States Patent
Rudischhauser et al.

(10) Patent No.: US 6,950,248 B2
(45) Date of Patent: Sep. 27, 2005

(54) DISTANCE HOLDER FOR LENS SYSTEM

(75) Inventors: Jürgen Rudischhauser, Tuttlingen (DE); Klaus Renner, Liptingen (DE); Markus Kupferschmid, Liptingen (DE)

(73) Assignee: Karl Stotz GmbH & Co. KG (DE)

( * ) Notice: Subject to any disclaimer, the term of this patent is extended or adjusted under 35 U.S.C. 154(b) by 0 days.

(21) Appl. No.: 10/360,193

(22) Filed: Feb. 7, 2003

(65) Prior Publication Data

US 2003/0174420 A1 Sep. 18, 2003

(30) Foreign Application Priority Data

Feb. 7, 2002 (EP) ............................................. 02002753

(51) Int. Cl.[7] ................................................ G02B 7/02
(52) U.S. Cl. ...................... 359/811; 359/819; 359/820
(58) Field of Search ................................ 359/811, 819, 359/820, 710, 808–809, 101, 130; 600/101, 130; 353/100; 362/455; 396/529

(56) References Cited

U.S. PATENT DOCUMENTS

| | | | | |
|---|---|---|---|---|
| 4,303,306 A | | 12/1981 | Ookawa | 350/252 |
| 5,601,525 A | * | 2/1997 | Okada | 600/160 |
| 5,999,344 A | | 12/1999 | Wulfsberg et al. | 359/819 |
| 6,146,326 A | * | 11/2000 | Pollack et al. | 600/141 |
| 6,201,649 B1 | * | 3/2001 | Rudischhauser et al. | 359/808 |
| 6,398,723 B1 | * | 6/2002 | Kehr et al. | 600/160 |

FOREIGN PATENT DOCUMENTS

DE 34 31 631 A1 3/1986

* cited by examiner

Primary Examiner—Hung Xuan Dang
Assistant Examiner—Joseph Martinez
(74) Attorney, Agent, or Firm—St. Onge Steward Johnston & Reens LLC

(57) ABSTRACT

Distance holder for lenses, which in terms of shape or material structure is configured in such a way that it exerts a slight notching effect on lenses on contact surfaces between a distance holder and a lens, so that the lens surface is less easily damaged.

16 Claims, 9 Drawing Sheets

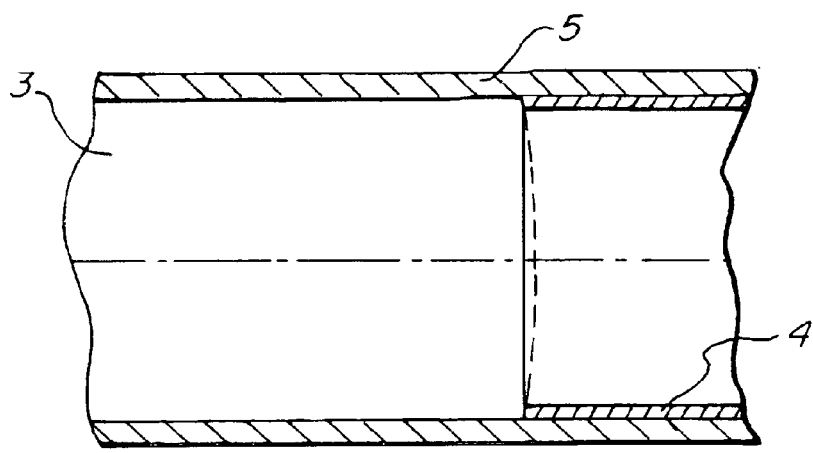
FIG. 3a
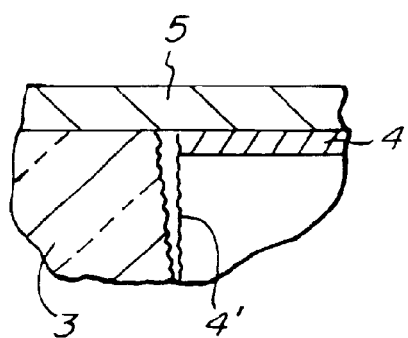 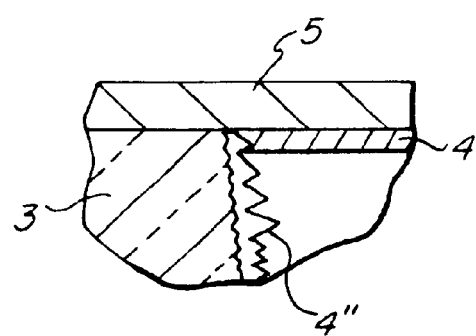
FIG. 3b FIG. 3c

DISTANCE HOLDER FOR LENS SYSTEM

This application claims priority from pending European Patent Application No. 02 002 753 filed Feb. 7, 2002.

FIELD OF THE INVENTION

The invention relates to a distance holder for a system of optical lenses.

BACKGROUND OF THE INVENTION

Optical lenses are used in a variety of optical instruments, such as in telescopes and binoculars, microscopes, endoscopes, and other viewing devices such as technoscopes, periscopes, and the like.

Optical lenses in the aforementioned applications are arranged as a rule in a shaft one after the other, in contact with one another or at a distance from each other, as a lens system. In endoscopes in particular, as well as in other viewing devices, lenses are often installed in the form of bar lenses.

Lenses in such a system are secured in place in the shaft, in that the external lenses of the system are tensed against one another in ring-shaped outer areas of their front surface by a securing device. Several lenses can be locked in place together if the lenses are placed against one another crown-to-crown or if distance holders, touching the lenses on ring-shaped outer areas of their front surfaces, are firmly pressed between pairs of neighboring lenses or between one lens and another component of the optical system such as the securing device. These distance holders are produced from metallic materials, especially brass, monel, China silver, or copper beryllium alloys Publication DE 197 32 991 8 presents an additional securing method for rod lenses of a lens system in a shaft. Here the lenses are held in their respective desired position by a contracting element positioned radially between the lens and the shaft.

As proposed in publication DE 197 50 685, it is also possible to cement lenses into the lens system shaft after they have been inserted into their desired position and centered.

A method in common use because it is very simple, however, is to secure and position the lenses in the shaft by means of a screwed-in securing device and a distance holder.

SUMMARY OF THE INVENTION

When lenses are installed in the shaft in this manner, mechanical pressures can result between lenses and distance holders, for instance abrasion on the point of contact between lens and distance holder, from the turning of rotatable securing devices in order to firmly tense the distance holders against the ring-shaped outer areas of the front surfaces of lenses that are to be secured. In addition, in the aforementioned lens systems, pressures from blows or bending can occur between lenses and distance holders if the particular lens system suffers an impact, for instance in falling.

Aside from mechanical damage, thermal pressures can affect the lens system, especially in medical endoscopy. For instance, in autoclaving (a treatment for cleansing the endoscope of germs), the endoscope is heated to 134 degrees C. Since the glass lens material usually has a thermal expansion coefficient different from the metallic materials of the shaft, which generally consists of monel, and from the distance holders, the result can be relative movements between neighboring lenses and distance holders as well as between lenses and the shaft. These movements also involve abrasive forces, especially between lenses and distance holders.

The forces brought to bear on lenses from distance holders can slightly damage the lenses, especially because these forces are at work near the rim between the optically effective surface of the lens and its radial area surface, and thus rim areas of the affected material can especially easily break off. Even when damage occurs outside of optically effective areas of the lens, an optically effective lens surface or the line of sight can be clouded through rubbed-off particles.

It is therefore the aim of this invention to develop distance holders in such a manner as to reduce the danger of damage to the lenses set apart by distance holders by means of the forces applied on the lenses by the distance holders.

The invention fulfills this aim by means of a distance holder with the characteristics cited in claim 1.

Advantageous embodiments and elaborations of the invention are set forth in the additional patent claims.

In accordance with claim 1, the distance holder is configured, in terms of shape and material construction, in such a way that it has a slight notching effect on lenses at the contact surfaces between distance holder and lens.

In accordance with one embodiment, the distance holder is configured as a distance sheath in terms of the shape or material structure in such a manner that it has a slight notching effect on lenses at the distance holder/lens contact surfaces during relative movements at these contact surfaces.

However, even without relative movement, there is a notching effect of the distance holder on the contact surfaces on the lens, and this effect must be kept to a minimum.

Either with or without relative movement, the notching effect depends on the surface roughness, hardness of the surface, and degree of friction between the distance holder and the lens, parameters which are minimized because of the inventive design of this distance holder.

Therefore the invention proposes that the degree of friction is kept low because of the selection of the distance holder material, so that minor forces arise from relative movements. If the inventive distance holder, however, can assume basically relative movements, a sufficient high degree of friction is proposed, so that despite relative acceleration, no relative movement occurs and thus sliding abrasive forces are prevented and the forces impacting the lenses are limited to normal and adhesive forces.

In an additional embodiment, the distance holder has a material on the contact surfaces that has a low surface hardness. In this manner the distance holder can consist exclusively of the material with low surface hardness, or else can have this material only on the contact surfaces, so that it is in combination with at least one additional material, a carrier material. This additional material is preferably a metallic substance or ceramic. It is an advantage that, of the distance holder materials, at least the carrier material has a thermal expansion coefficient similar to that of the endoscope shaft, so that relative movements between the shaft and the optical components are kept to a minimum.

The material with low surface hardness and thus low notching effect, which is found at least in the lens contact areas, can be configured on the carrier material as a plating, coating, or lacquer. Alternatively, the contact surface material can also be restricted to the axial ends of the additional material and be applied to the additional material there.

For the material with low surface hardness, the invention especially proposes synthetic, particularly a thermoplastic plastic, which keeps its shape up to at least 134 degrees C. A synthetic, especially a thermoplastic material, offers advantages in terms of manufacturing precision, particularly at small dimensions, which are necessary for instance for the distance holders for endoscopic lens systems.

To avoid abrasion on contact surfaces between lenses and distance holders, it is advantageous if the roughness of the relevant surfaces is low.

In addition to a reduction of surface hardness, an adjusted degree of friction, and a finer surface structure, as opposed to conventional metallic distance holders in each case, such as brass, a reduced notching effect of the distance holder on the lens is possible if the pressure force of the distance holder on the lens is limited by elastic design of the autoclaving process in the axial direction. Here the lens system, after reshaping, for instance in an autoclaving process, should be restored to its original structure; that is, it should behave at given temperatures in purely elastic manner, without plastic part. The term "elastic" should be understood here to mean that the distance holders have sufficient time available to be restored to their shape before the thermal treatment (the next use of the rod lens system usually occurs in the space of minutes or hours after an autoclaving, for instance).

Elasticity can be achieved by configuring the distance holder in such a way that the axial end surfaces are elastic with respect to one another; that is, they can absorb or blunt axial puncturing force through damping motion.

In addition to axial impacts, the distance sheath in one embodiment of the invention also accepts torsion pressures such as can occur from the screwing to assemble a lens system, and bending pressures which result, for instance, from the dropping of an endoscope that includes a rod lens system. Especially in the case where the lens system is a rod lens system, it is advantageous that bending pressures are absorbed by the distance holders, because these bending pressures result in very strong leveraging on the rod lenses and can cause them to break.

Elasticity can also be assured through appropriate choice of material for the distance holder, either by constructing the entire distance holder from elastic material or by combining an elastic material and a carrier material in order to ensure axial elasticity.

In this case the carrier material for the distance holder is preferably metallic or a ceramic material.

As an elastic material, the invention proposes synthetic, preferably a thermoplastic synthetic, especially because it is easily produced, particularly in the reduced dimensions required in medical endoscopes.

This thermoplastic synthetic material should retain its shape up to at least 134 degrees C. so that lens system structure, especially the distance between individual lenses, is not altered in the autoclaving process, which occurs at that very temperature. In application, it is proposed that the qualification temperature of the distance holder material for shape retention during heating should be raised to 137, 139, or even 142 degrees C. as a security value.

Reinforced synthetics, because of the required heat resistance, are also appropriate materials for the distance holders. However, appropriate manufacturing processes are required to ensure that no reinforcing fibers appear on the contact surfaces between lenses and distance holders.

A distance holder can also, as described above, be elastic by virtue of its shape. Such elastic design can be achieved through at least one opening or one reduction in the wall strength of the distance holder. The opening or openings, as well as one or more sections of reduced wall strength, can be configured lengthwise, crosswise, or diagonally to the axis of the distance holder.

BRIEF DESCRIPTION OF THE DRAWINGS

In the following, the invention is described by means of embodiments as illustrated in the following figures. These illustrations are as follows:

FIGS. 3a, 3b, 3c Points of contact between lens and distance holder with theoretic depiction of the roughness of the distance holder front surface, where in FIG. 3b the roughness is minor while in FIG. 3c the roughness is considerable.

DETAILED DESCRIPTION OF THE DRAWINGS

In the following, embodiments are described for the realization of the invention.

Figure 1:
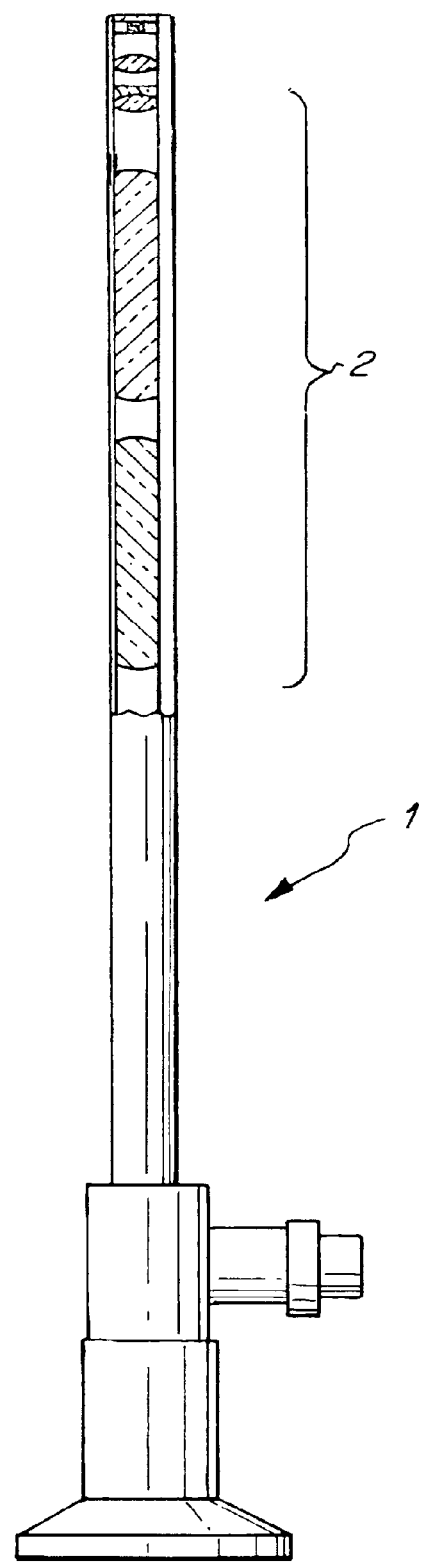
FIG. 1 Endoscope with a rod lens system, with an inventive distance holder.

FIG. 1 shows an endoscope 1 in which a rod lens system 2 is inserted.

A cut-out section of the rod lens system 2 consisting of rod lenses and distance holders is depicted in greater detail in FIG. 2, where the illustrated detail shows only one rod lens 3 and one neighboring distance holder 4. The distance holder 4 is located in the rod lens system 2 between two rod lenses 3, and bolts hold these components together. For this purpose, two sheath-shaped shaft components 5 are bolted together so that a first shaft component 5 situated on the first side holds a first external lens, laid on the first side, axially with force to a second side and a second shaft component 5 situated on the second side holds a second external lens laid on the second side with force to the first side. Between the lenses held by force, at least the one distance holder 4 is applied, so that the system 2 with at least two rod lenses 3 and the distance holder 4 is pressed so as to be axially secured.

The distance holders 4 are pressed onto locations on the lenses which are situated on external rings on the optically effective surfaces 6.

Figure 2A:
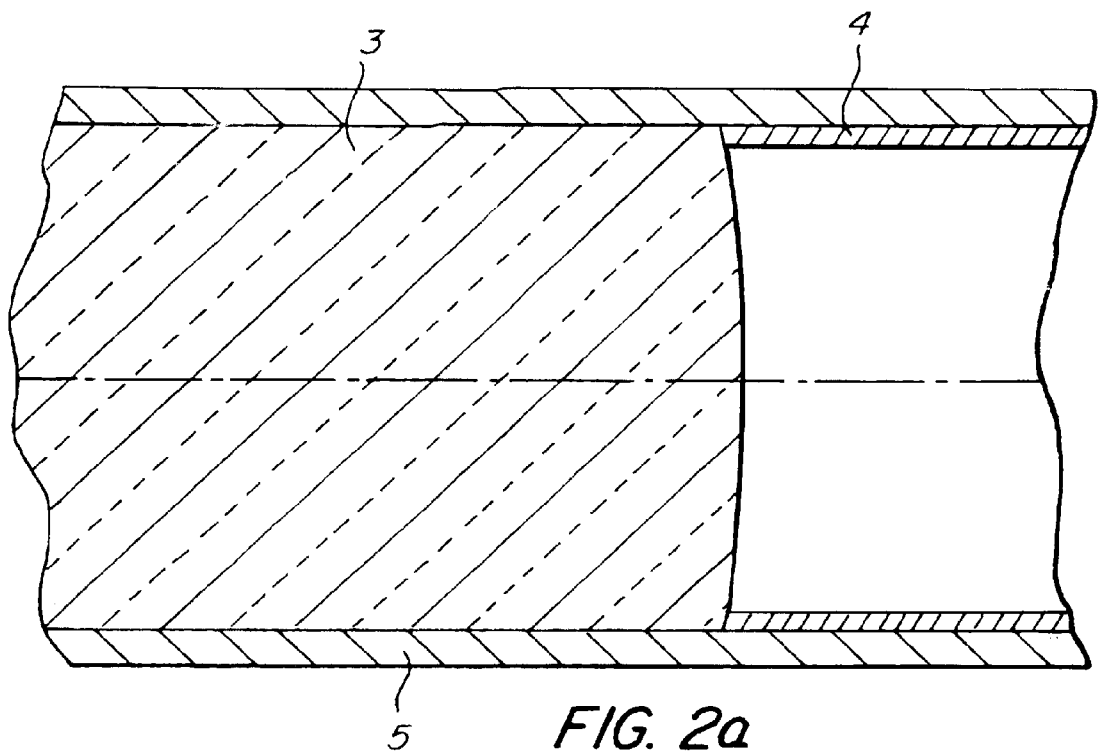
FIG. 2a Cut-out view of the rod lens system of FIG. 1.
Figure 2B:
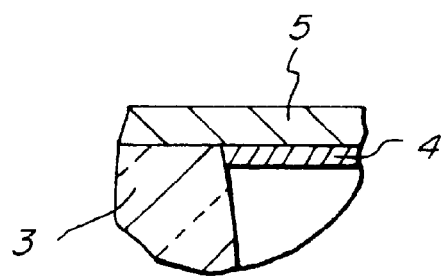
FIG. 2b Enlarged cut-out view of FIG. 2a depicting a point of contact between lens and distance holder with fissures occurring at those points in the lens.

Damage in the form of fissures is shown in FIG. 2b as a detail of the cut-out view from FIG. 2a.

To prevent such a damage of the lens through the distance holder moving in relation to it, the distance holder in this embodiment is produced of a material with low surface hardness and in the desired temperature range of good elasticity, the thermoplastic synthetic material PEEK. For this purpose the synthetic material with the brand designation TECAPEEK of the Ensinger firm can be used, for instance. This material—not graphite-reinforced—has at 140 degrees C. sufficient heat shape retention and, besides its low surface hardness, good slide resistance with the lens material being employed, glass, so that the rubbing distance holder material has good time resistance, and soiling or clouding of the sight canal of the lens system is minimized. Aside from this PEEK without graphite admixture, a PEEK with low graphite addition can be appropriate for use. An advantageous characteristic in using the aforementioned materials is their dark or black coloring. By means of dark or unvarnished, optically ineffective surfaces, undesired reflection effects are prevented.

As an alternative to PEEK, the invention proposes the equally dark synthetic PPSU. Other synthetics serving the purpose include, for instance, the thermoplasts polysulfon (PSU), polyethersulfon (PES), CAB, PEKEKK, PES, and PSU, which however seem to be less appropriate than the aforementioned synthetics in terms of desired material characteristics.

FIG. 3a once again shows the contact points between a lens 3 and a distance holder 4. FIGS. 3b and 3c each present the same cut-out view in detail, where FIG. 3b shows a theoretical depiction of a front-side distance holder surface 4' with low roughness and FIG. 3c shows a theoretical depiction of a front-side distance holder surface 4" with a high degree of roughness. By means of increased roughness of the contact surfaces 4', 4" of the distance holder 4 on the lens 3, when the points of the distance holder surface are not flattened by the pressure, the notching and also the chip-removal effect on the contacted lens surface is increased on the one hand, while on the other hand the degree of friction [Greek letter] mu consequently is generally increased as well, with a shearing effect on the lens surface layer in relation to the next lens layer, while particles can be torn out of the lens material combination.

Figure 4:
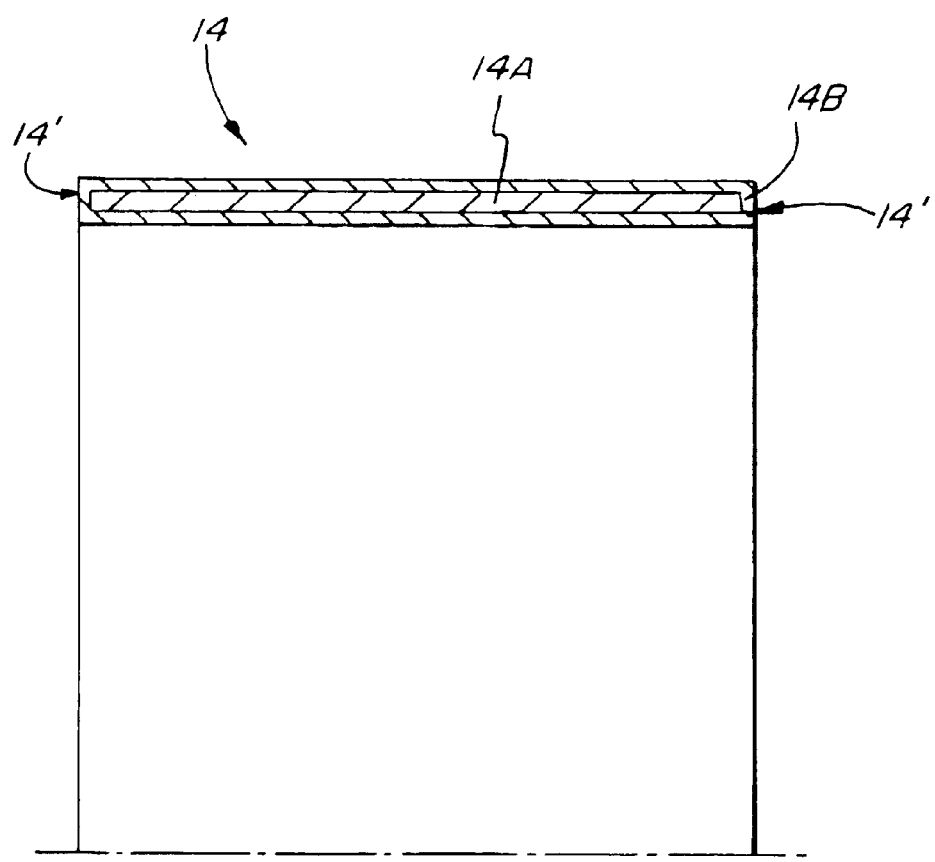
FIG. 4 Combination of materials, including one material applied as plating, coating, or lacquer on a carrier material which is elastic and/or has low surface hardness.

In another embodiment the distance holder 14, shown in FIG. 4, is constructed of a combination of a carrier material 14A, here a steel alloy, and a thermoplastic coating 14B. As a result, certain elasticity, in the bending and axial direction, but more in the tangential direction, is assured between the front-side end surfaces 14' of the distance holder 14. Essentially, however, the low surface hardness here is paired ideally with favorable friction characteristics as a result, through appropriate choice of the thermoplastic material between the distance holder 14 and the lens 3.

Figure 5A:
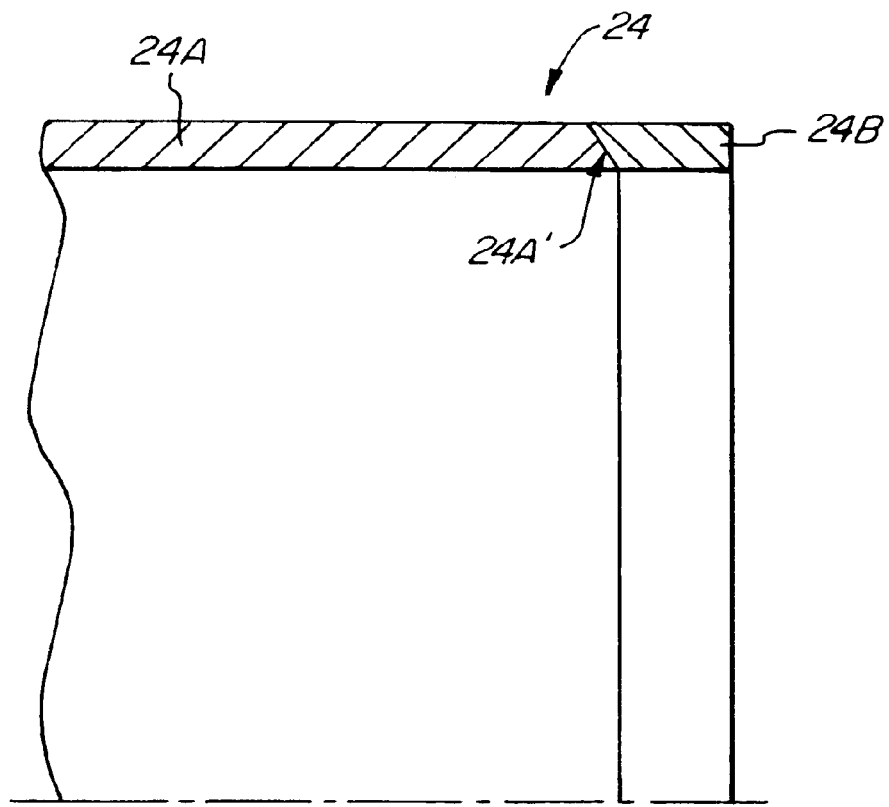
FIGS. 5a, 5b Material with high elasticity and/or low surface hardness as axial terminal element of a piece of carrier material of the distance holder with a conical connecting surface.
Figure 5B:
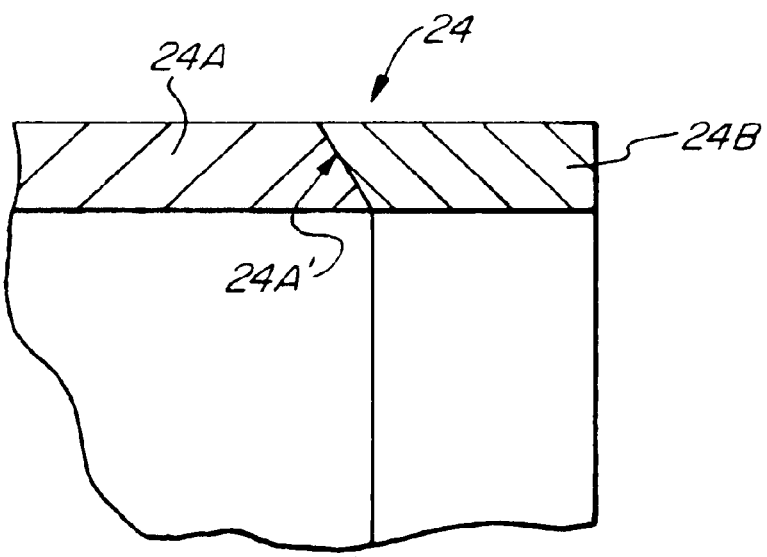

An additional configuration of the distance holder 24 is presented in FIG. 5a and the detail view of FIG. 5b of FIG. 5a. Here, on the axial ends of a carrier material 24A, which can be a copper alloy for instance, an axial end piece 24B is added on, made of thermoplastic elastic material which is an elastic material in the desired temperature range and shows a low notching or even chip-removal effect on the lens secured by this distance holder 24, through its low hardness and smooth front-side surface. The connection between the carrier tube 24A and the axial end tube pieces 24B can be made by cementing or soldering, for instance by friction soldering. FIGS. 4b and 4c show the particularity whereby the carrier tube 24A is pointed circularly at a certain angle to the distance holder axis at its axial ends, of which the right axial end 24A' is shown, and the end tube pieces 24B, of which the right end tube piece 24B is shown, are adjusted to the axial point ends 24A' of the carrier tube 24A. By this means it is ensured that the end tube pieces 24B can be centered in relation to the carrier tube 24A.

Figure 6A:
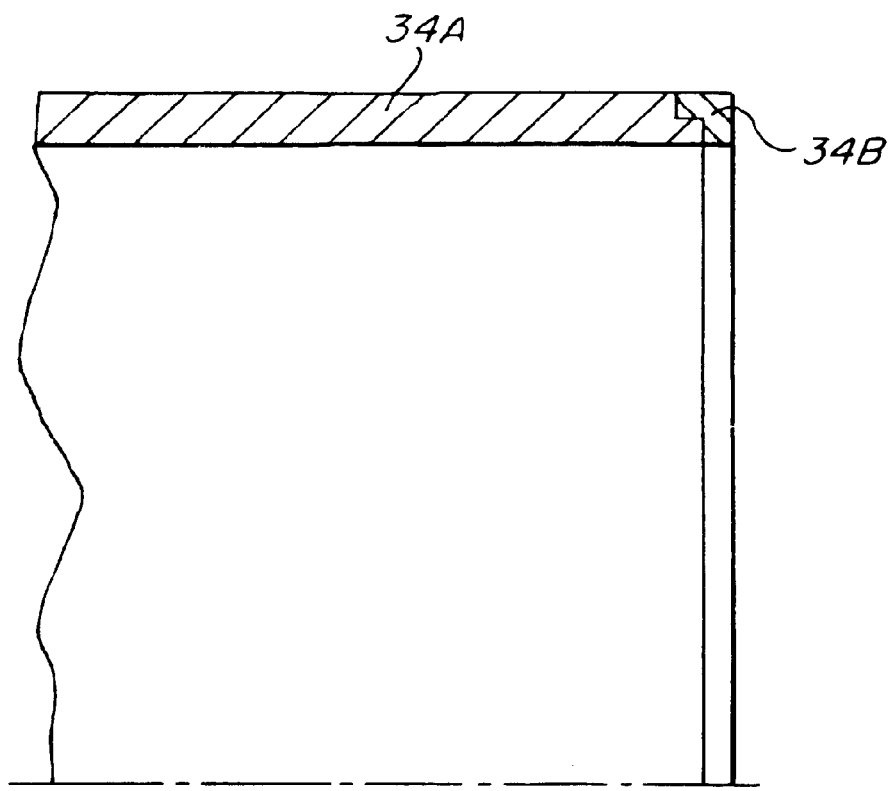
FIGS. 6a, 6b Material with high elasticity and/or low surface hardness as axial terminal element of a piece of carrier material of the distance holder with a stepwise connecting surface.
Figure 6B:
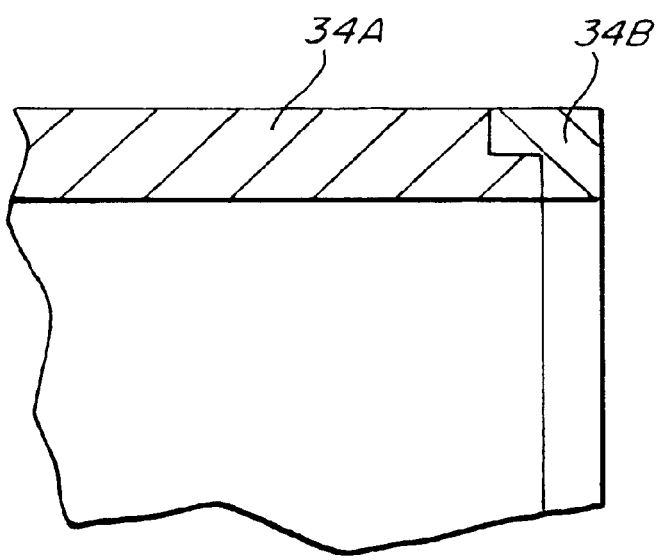

The configuration of the distance holder seen in FIGS. 6a and 6b also ensures a good possibility of centering. This is possible because, with carrier tube 34A, the axial ends are reduced in stages in external diameter and, with the axial end tube pieces 34B, the ends facing the axial ends of the carrier tube 34A, adjusted in shape to the carrier tube ends 34A are widened in stages in their internal diameter. Naturally, a combined form of the embodiments is conceivable, as seen in FIGS. 5a and 5b and FIGS. 6a and 6b, for instance with step-wise reduced ends which, as such, are conical in shape.

In the embodiments just referred to in FIGS. 4 to 6b, the carrier tube 14A, 24A, 34A as main component of the distance sheath 14, 24, 34 is in each case made of a mechanically rigid material, preferably a metallic material such as a steel or copper alloy, which for instance in an autoclaving process has an elongation like that of the rod lens shaft 5, resulting in lower tensions, especially on the contact surfaces of the lenses 3 with the distance holders 4 of the rod lens system, when this system is involved in autoclaving.

Figure 7A:
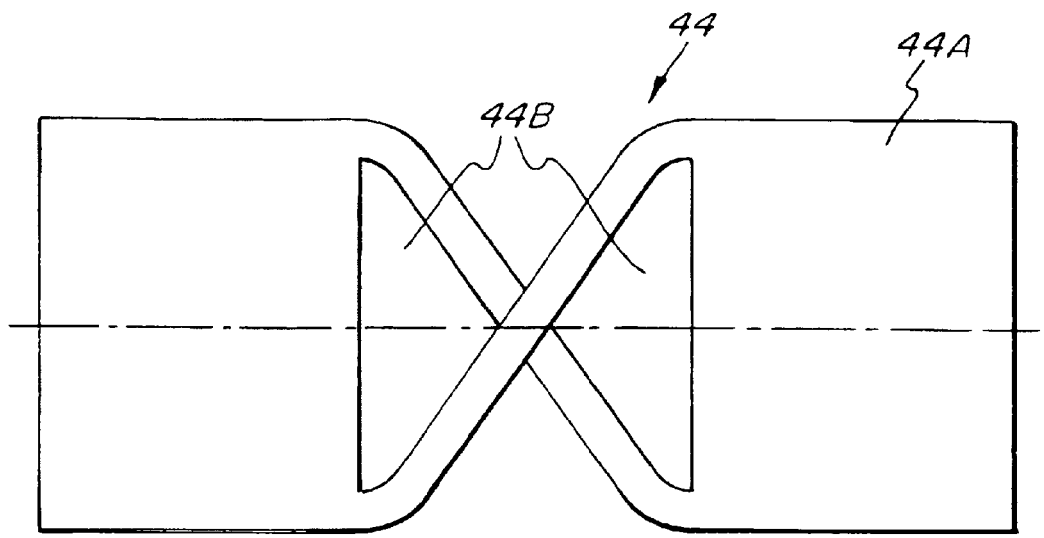
FIGS. 7a, 7b Configurations of distance holders with cut-out views through wall sections running in circular screw pattern or lengthwise with respect to the distance holder axis.
Figure 7B:
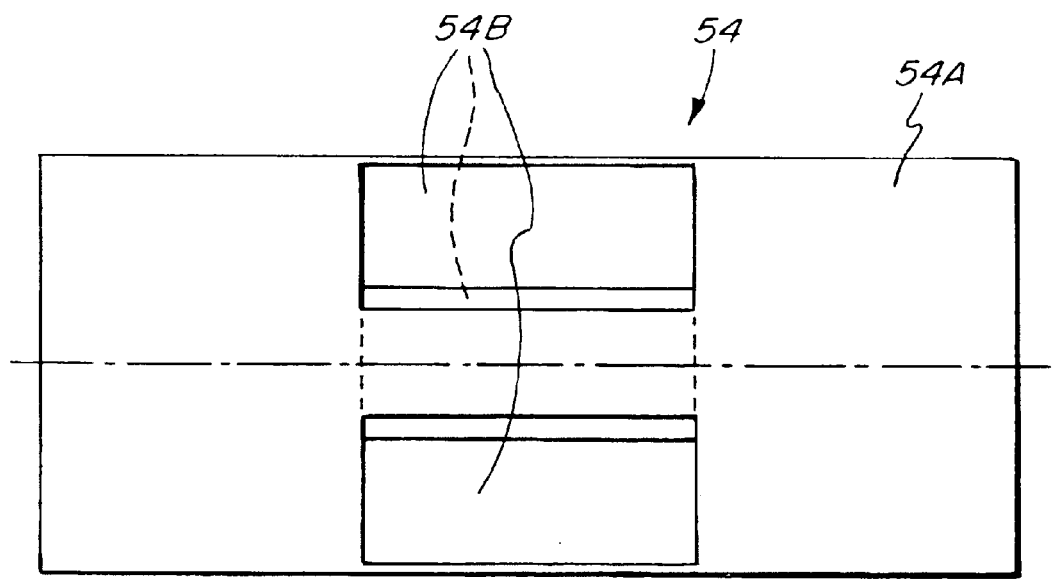

FIGS. 7a and 7b depict distance holders 44, 54 which are made of a traditional distance holder material such as copper and whose elasticity, however, especially in the axial direction, is determined by the fact that the distance holder material in the axial center area of the distance holder 44, 54—that is, in areas outside the contact points 44A, 54A with the lens—includes cut-out sections 44B, 54B, running through the entire wall.

According to the embodiment in FIG. 7a, these cut-out sections 44B, two pieces in this illustration, are fields with spiral-shaped openings, here with a constant width, though this is not indispensable. According to the embodiment in FIG. 7b, the sections 54B—three in this illustration—are in the form of axial cylindrical sheathing segments 54B. In terms of axial elasticity, the embodiment of FIG. 7a is preferable to the one in FIG. 7b; however, 7b is less costly to produce. Both embodiments show increased elasticity not only in the axial direction, but also in terms of bending as well as torsion, which can result in reduced tension, for instance from sudden bending pressure when an endoscope falls to the floor, and from torsion pressure of the rod lens system, for instance in the process of screwing together the rod lens system when strong friction occurs between a lens 3 and a distance holder 4.

Figure 8A:
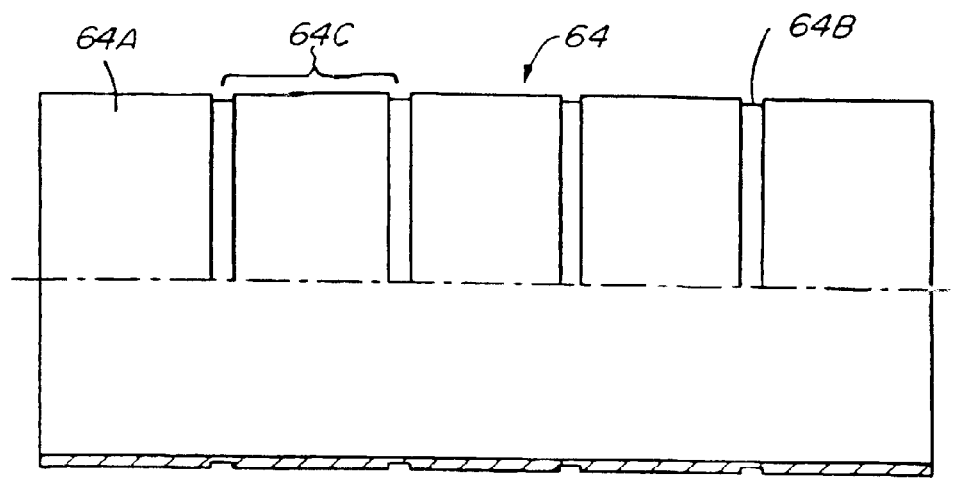
FIGS. 8a, 8b Configurations of the distance holder with sections of reduced wall strength.
Figure 8B:
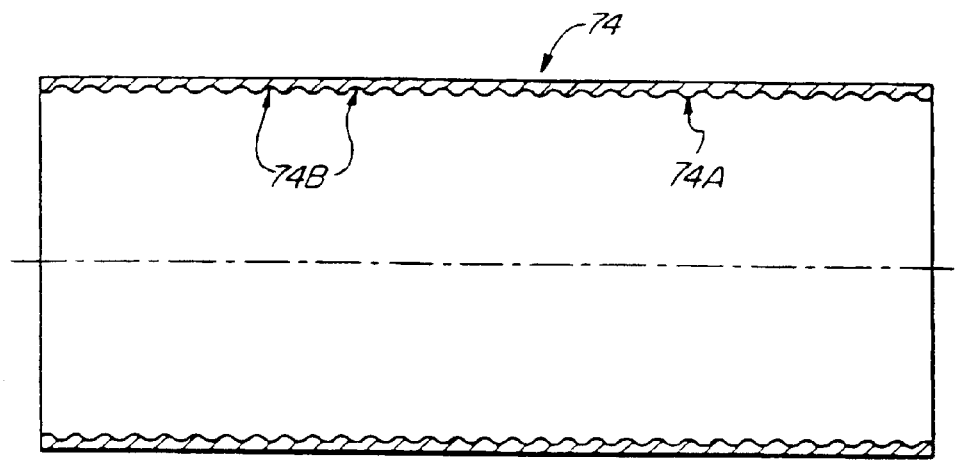

Additional inventive embodiments of distance holders 64, 74 are depicted in FIGS. 8a and 8b. FIG. 8a shows how, with a conventional distance holder tube, surrounding wall strength reductions 64B are carried out in certain distances 64C which are constant here; that is, rings 64B have reduced wall strength in comparison to areas 64B with the original wall strength. In the illustrated example the wall strength reductions are made radially outward, which is easier to produce; however, wall strength reductions are also possible from the inside.

Figure 9:
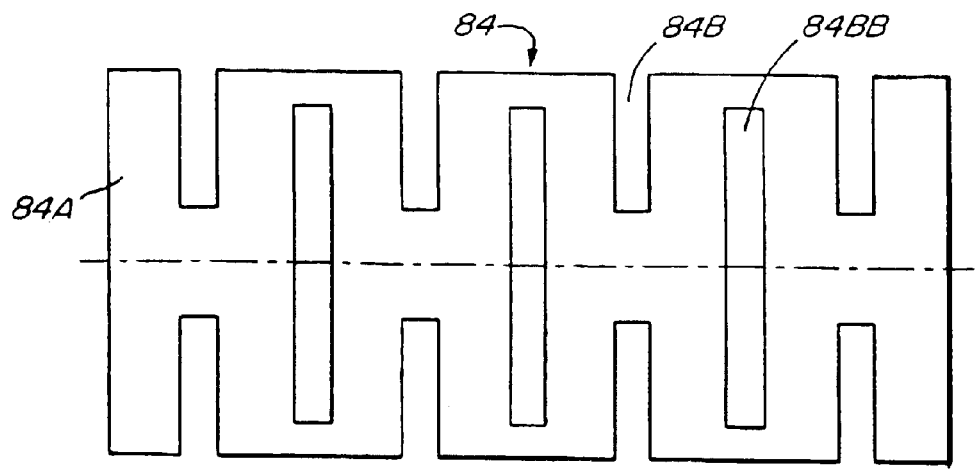
FIG. 9 Configuration of the distance holder with cross-sections through wall sections running crosswise to the distance holder axis.

In the embodiment shown in FIG. 8b, wall strength reductions 74B are carried out as wave troughs 74B in the longitudinal section of the distance sheath 74. This is particularly simple to achieve if these wave troughs 74B extend spirally on the inside of the distance sheath 74. This configuration can be produced through a type of threaded screw drilling process. Naturally an arrangement of the wave troughs 74B and wave crests entirely in the peripheral direction is also conceivable The embodiment according to FIG. 9 shows sections 84B, 84BB similar to those of FIG. 7b, except that the sections 84B, 84BB have their width direction parallel to the distance holder axis. Here, according to the illustration, two sections 84B, 84BB each time are foreseen in a cross-section of the distance holder opposite to one another with respect to the distance holder axis. Two neighboring section pairs 84BB, 84B are mounted turning at 90 degrees around the distance holder axis, so that in addition to axial elasticity there can be bending elasticity, which is constant around each axis which can be placed through the distance holder axis in a cross-section of the distance holder. This is the case when an equal number of section pairs 84BB and section pairs 84B are foreseen. The axial end sections of a distance sheath 84 of this embodiment, like the aforementioned distance sheaths with the exception of the one of FIG. 8b, have areas 44A, 54A, 64A, 84A, of the contact surfaces with the respective neighboring lens, which are not treated with material reduction.

Figure 10A:
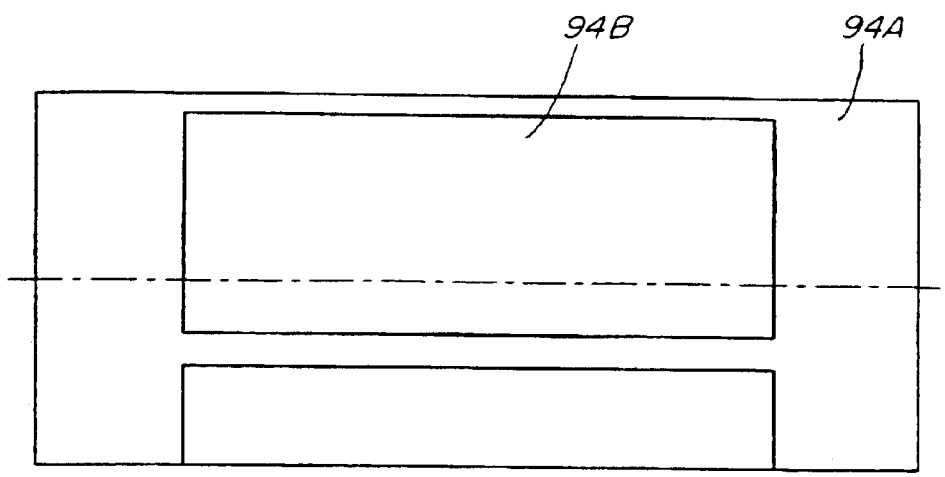
FIGS. 10a, 10b Configurations of the distance holder made of elastic material and a carrier material with cross-sections through wall section of the carrier material running lengthwise or in circular screw pattern with respect to the distance holder axis, with the elastic material inserted into the respective intervals.
Figure 10B:
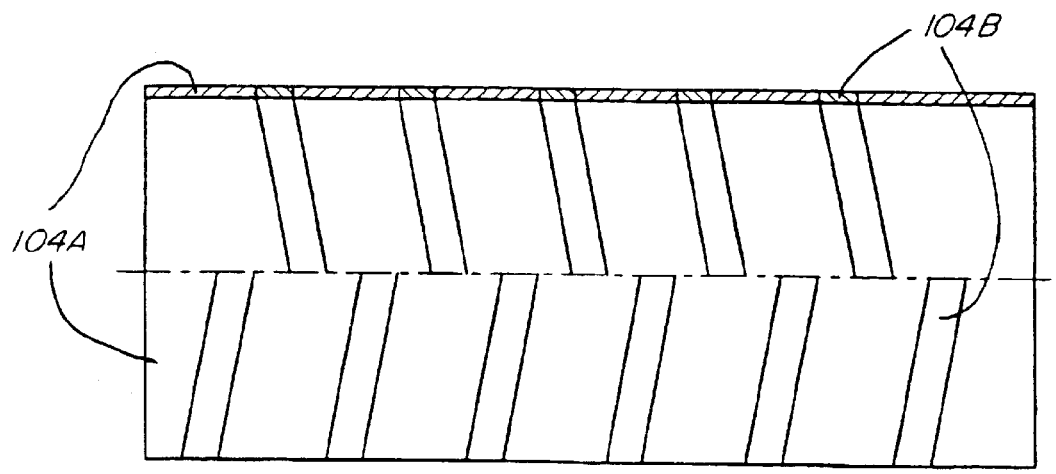

Aside from the manufacture of the distance holders of elastic material 4 or with elastic materials 14B, 24B, 34B applied on the ends or as a plating on carrier materials 14A, 24A, 34A or distance holders 44, 54, 64, 74 which consist of basically low elastic material such as metal alloys conventionally used for distance holders and whose elasticity is ensured through reductions 64B, 75B or recesses 44B, 54B, 84B, 84BB, there can also be a combination as in FIGS. 10a and 10b in which a basically low-elastic carrier material 94A, 104A has cut-out sections 94B, 104B through the entire cylinder wall, which are filled with an elastic material 94B, 104B. As construction material for the carrier material 94A, 104A and the elastic material 94B, 104B, it is conceivable to use the previously mentioned respective materials for this purpose. For these embodiments, FIG. 10a shows an example in which cylindrical sheath segments 94B of elastic material are inserted into axial cylindrical sheath segments 94B of the carrier material 94A. FIG. 10b shows spiral sections 104B of a carrier tube 104A where here again elastic material 104B is inserted into the sections 104B. In similar manner to the embodiments with cut-out carrier material 44, 54, 84, here again elasticity in terms of elongation/jogging, torsion, and bending is ensured. The elastic material can also provide damping in receiving the vanous pressures.

The illustrated embodiments serve only as a description of the invention; the scope of claimed protection however is not restricted to them.

What is claimed is:

1. A distance holder for lenses, wherein the distance holder is designed in terms of shape or material structure in such a way that it exerts a slight notching effect on lenses on contact surfaces between the distance holder and a lens;

wherein the distance holder has a material with low surface hardness on the contact surfaces:

wherein the distance holder comprises of the material with low surface hardness only on contact surfaces: and wherein the distance holder comprises of a combined material made up of the material with low surface hardness and a carrier material.

2. A distance holder as defined in claim 1, wherein the carrier material is metallic or ceramic.

3. A distance holder according to claim 2, wherein the material with low surface hardness is a plating, coating, or lacquer on the carrier material.

4. A distance holder according to claim 2, wherein the material with low surface hardness is applied on the axial ends on the carrier material.

5. A distance holder according to claim 4, wherein the material with low surface hardness is a synthetic.

6. A distance holder as defined in claim 5, wherein the synthetic is a thermoplastic synthetic that retains its shape up to at least 134 degrees C.

7. A distance holder for lenses, wherein the distance holder is designed in terms of shape or material structure in such a way that it exerts a slight notching effect on lenses on contact surfaces between the distance holder and a lens;

wherein the distance holder is designed to be elastic in such a way that the force it exerts on lenses on contact surfaces between the distance holder and the lens is limited;

wherein the distance holder has a shape which causes the axial end surfaces to be elastic toward one another;

wherein the distance holder has material that is elastic; and wherein the elastic material is in combination with a carrier material.

8. A distance holder as defined in claim 7, wherein the carrier material is metallic or ceramic.

9. A distance holder as defined in claim 8, wherein the elastic material is a synthetic.

10. A distance holder as defined in claim 9, wherein the synthetic is a thermoplastic synthetic that retains its shape up to at least 134 degrees C.

11. A distance holder as defined in claim 10, wherein the shape of the distance holder has at least one opening or a wall strength reduction.

12. A distance holder as defined in claim 11, wherein the at least one opening or a wall strength reduction is arranged lengthwise, cross-wise, or diagonal to the axis of the distance holder.

13. A distance holder as defined in claim 12, wherein the radial inside of the distance holder is dark or unvarnished.

14. An optical system, having distance holders as defined in claim 13.

15. An optical system as defined in claim 14, wherein it has rod lenses as lenses.

16. An endoscope which has an optical system as defined in claim 15.

* * * * *

UNITED STATES PATENT AND TRADEMARK OFFICE
CERTIFICATE OF CORRECTION

PATENT NO. : 6,950,248 B2
DATED : September 27, 2005
INVENTOR(S) : Rudischhauser et al.

It is certified that error appears in the above-identified patent and that said Letters Patent is hereby corrected as shown below:

Title page,
Item [73], Assignee, should read -- Karl Storz GmbH & Co. KG (DE) --.

Signed and Sealed this

Twenty-ninth Day of November, 2005

JON W. DUDAS
*Director of the United States Patent and Trademark Office*